US008896417B2

(12) United States Patent
Song et al.

(10) Patent No.: US 8,896,417 B2
(45) Date of Patent: Nov. 25, 2014

(54) SYSTEM AND METHOD FOR OPERATING GATE

(71) Applicant: Hyundai Motor Company, Seoul (KR)

(72) Inventors: Youngwook Song, Seoul (KR); Huijeong Bae, Suwon-si (KR); Kichang Yi, Busan (KR)

(73) Assignee: Hyundai Motor Company, Seoul (KR)

( * ) Notice: Subject to any disclaimer, the term of this patent is extended or adjusted under 35 U.S.C. 154(b) by 99 days.

(21) Appl. No.: 13/712,637

(22) Filed: Dec. 12, 2012

(65) Prior Publication Data

US 2014/0009264 A1 Jan. 9, 2014

(30) Foreign Application Priority Data

Jul. 4, 2012 (KR) ........................ 10-2012-0073072

(51) Int. Cl.
*G05B 19/00* (2006.01)
*G08C 19/00* (2006.01)

(52) U.S. Cl.
CPC ...................................... *G08C 19/00* (2013.01)
USPC ............................. 340/5.1; 340/5.2; 340/5.72

(58) Field of Classification Search
None
See application file for complete search history.

(56) References Cited

U.S. PATENT DOCUMENTS

| | | | | |
|---|---|---|---|---|
| 6,825,752 | B2 | 11/2004 | Nahata et al. | |
| 2008/0129446 | A1 | 6/2008 | Vader | |
| 2008/0296926 | A1 * | 12/2008 | Hanzel et al. | 296/146.1 |
| 2013/0009785 | A1 * | 1/2013 | Finn et al. | 340/870.01 |

FOREIGN PATENT DOCUMENTS

| | | | |
|---|---|---|---|
| JP | 2007-016412 | A | 1/2007 |
| KR | 10-1998-0060161 | A | 10/1998 |
| KR | 1020010054921 | A | 7/2001 |
| KR | 100892384 | B1 | 4/2009 |

* cited by examiner

*Primary Examiner* — Mohammad Ghayour
*Assistant Examiner* — Brian Wilson
(74) *Attorney, Agent, or Firm* — Morgan, Lewis & Bockius LLP

(57) ABSTRACT

A system for operating a gate of a vehicle may include a laser diode unit that shows step positions for operating the gate by radiating a plurality of laser points onto the ground, an ultrasonic wave sensor unit that measures the distance between the bottom of the rear bumper and the step positions and senses step input from a change in the distance due to the user stepping on the step positions, a gate driving unit that opens/closes the gate, using a driving part, and a control unit that controls the opening/closing operation of the gate driving unit on the basis of information on a step-on status kept for a predetermined time by the user which may be found by the ultrasonic wave sensor unit.

17 Claims, 8 Drawing Sheets

SYSTEM AND METHOD FOR OPERATING GATE

CROSS-REFERENCE TO RELATED APPLICATION

The present application claims priority to Korean Patent Application No. 10-2012-0073072 filed on Jul. 4, 2012, the entire contents of which is incorporated herein for all purposes by this reference.

BACKGROUND OF THE INVENTION

1. Field of the Invention

The present invention relates to system and method for operating a gate of a vehicle.

2. Description of Related Art

In general, the users of RVs (Recreation vehicle) such as MPVs (Multi-Purpose Vehicle) and SUVs (Sports Utility Vehicle) usually intend to mount more baggage in comparison to the users of common sedan cars.

Further, because more people want to enjoy various leisure and dilettante lives with an increase of the incoming level and improvement of work conditions due to the five-days week system, the demand for the RVs keeps increasing.

On the other hand, in the past, when approaching a vehicle with loads fully in both hands, the users have to open the gate after putting down the loads on the ground, using a remote control key, and then put the loads on the vehicle, which is troublesome. The gate means the power gate and the gage of vehicles which are automatically opened/closed.

Even when carrying a large amount of loads in the vehicle to another place, similarly, there is a problem in that the users have to close the gate, using the remote control key, after putting down the loads on the ground.

Various types of technologies for a driver to automatically operate and open the gate of RVs without using a hand have been developed to solve the problem.

This is based on a technology that senses approach of a driver by using a smart key when the driver with loads in both hands approaches a vehicle, and then automatically opens a locked door in response to an input for opening door from the driver touching a sensor on the door handle, kicking a kick switch, or blocking a radiated laser beam.

This method, however, has a problem in that a malfunction such as that the door is unexpectedly opened may occur, because the way of input for opening the door by the user is simple.

Further, a user has to swings his/her foot in order for the sensor senses the action in the way of blocking a laser beam in the related art, but a user with a large amount of loads may lose his/her balance, so that this way is difficult to use.

Further, there is a problem in the Patent Document in that it is difficult to full automatically control the door when closing a door in order to carry a large amount of loads in the vehicle, because only opening a door is described in the document.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing full automatic system and method for operating a gate of a vehicle having advantages of allowing a driver to automatically and stably open or close a gate, even if the driver cannot freely use his/her hands.

According to an embodiment of the present invention, a system for operating a gate of a vehicle may include a laser diode unit that shows step positions for operating the gate by radiating a plurality of laser points onto the ground, an ultrasonic wave sensor unit that measures the distance between the bottom of the rear bumper and the step positions and senses step input from a change in the distance due to the user stepping on the step positions, a gate driving unit that opens/closes the gate, using a driving part, and a control unit that controls the opening/closing operation of the gate driving unit on the basis of information on a step-on status kept for a predetermined time by the user which is found by the ultrasonic wave sensor unit.

The system may further include a smart key recognizing unit that recognizes a smart key of a user who is in a predetermined area from a vehicle and detects a position of the user.

The laser diode unit may radiate the laser points onto the ground, when the smart key recognizing unit senses the position of the user with the smart key recognized.

The laser diode unit may radiate the laser points onto the ground, when the ultrasonic sensor senses step input of the user.

The laser diode unit may remove the laser points step by step for the predetermined time for which the user is supposed to steps on the step positions and keep the step-on status.

The control unit may control the gate driving unit for opening, when the user removes the step-on status after keeping the step-on status for a predetermined time, with the gate closed.

The control unit may control the gate driving unit for closing, when the user removes the step-on status after keeping the step-on status for a predetermined time, with the gate open.

The laser points may be radiated in any one shape of a circle, a polygon, and a foot shape and an arrow shape which guides a step from a predetermined direction of the rear bumper.

The system for operating a gate may further include an emergency light that visually shows the entire process of operating the gate according to the step input of the user by flickering an emergency lamp, and a speaker that aurally outputs the process of operating the gate, using an alarm.

The control unit may output an announcement such that the user safely steps back behind an opening/closing range of the gate, through the speaker in the opening/closing operations of the gate driving unit.

According to one embodiment of the present invention, a method of operating a gate by using a system for operating a gate of a vehicle, may include a) detecting a position of a user who is in a predetermined area from a vehicle, b) showing step positions by radiating a plurality of laser points onto the ground when ascertaining the position of the user with the position of a user detected, c) measuring the distance between the bottom of the rear bumper and the step positions and sensing step input from a change in the distance due to the user stepping on the step positions, and d) controlling opening/closing operations of a gate driving unit, when the user succeeds in keeping the step-on status for a predetermined time.

According to another embodiment of the present invention, a method of operating a gate by using a system for operating a gate of a vehicle, may include a) sensing step input of the user by the user stepping on step positions where laser points are likely to be radiated onto the ground, b) showing step positions by radiating a plurality of laser points onto the ground, when sensing step, c) measuring the distance between the bottom of the rear bumper and the step positions and sensing step input from a change in the distance due to the user stepping on the step positions, and d) controlling opening/closing operations of a gate driving unit, when the user succeeds in keeping the step-on status for a predetermined time.

The method may include informing the user of the situation that the step-on state is kept by removing the laser points step by step within the predetermined time, between the step c) and step d).

The step d) may output an announcement such that the user steps back behind an opening/closing range of the gate, through a speaker, when the user succeeds in keeping the step-on status.

The step d) may transmit a control signal for the operation of the gate driving unit by sensing removal of step-on by the user taking a foot back from the step position.

The step d) may open/close the gate, after making sure that the user is spaced at a predetermined distance from the rear bumper.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
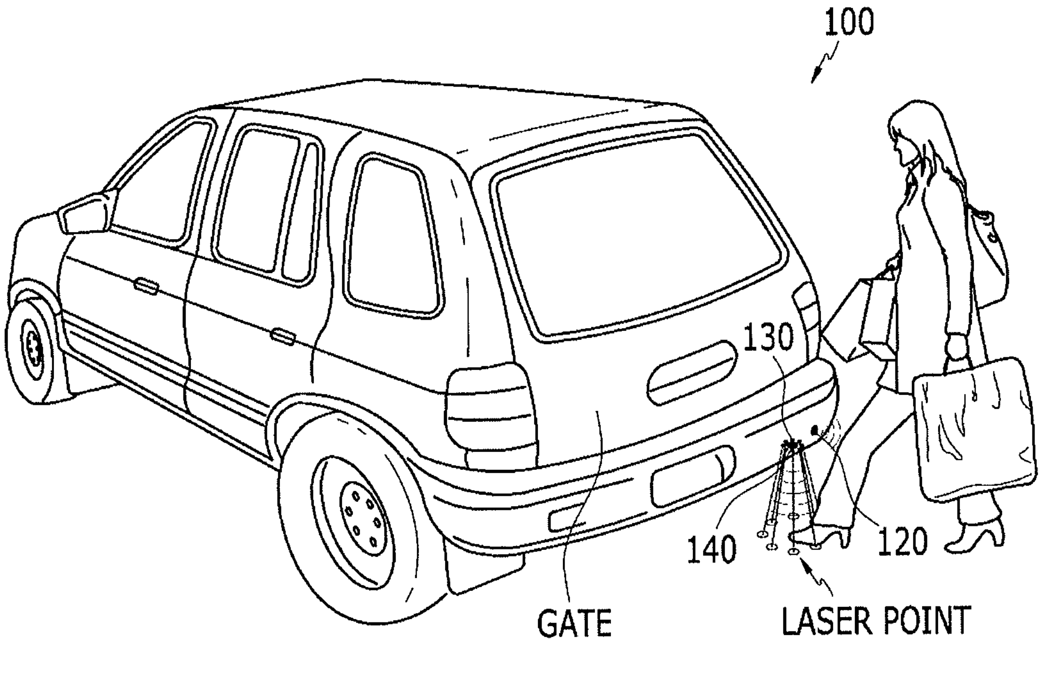
FIG. 1 is a schematic view illustrating a system for operating a gate of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word “include” and variations such as “includes” or “including”, will be understood to imply the inclusion of stated elements but not the exclusion of any other elements. In addition, the terms “-er”, “-or” and “module” described in the specification mean units for processing at least one function and operation and can be implemented by hardware components or software components and combinations thereof.

System and method for operating a gate according to exemplary embodiments of the present invention are described hereafter in detail with reference to the drawings.

FIG. 1 is a schematic view illustrating a system for operating a gate of a vehicle according to an exemplary embodiment of the present invention.

Figure 2:
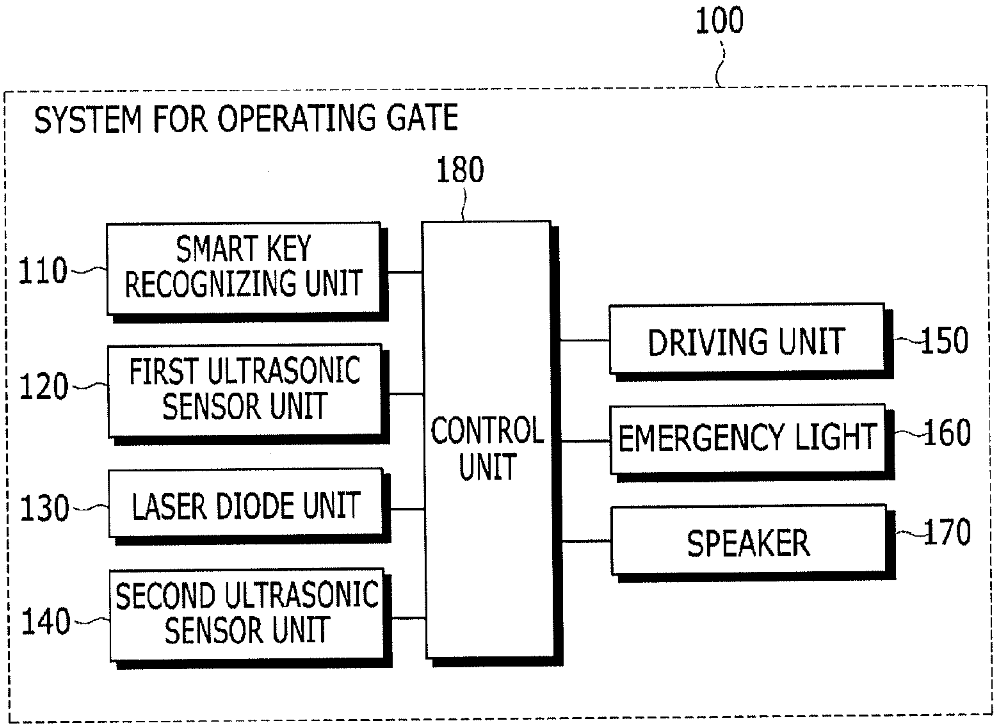
FIG. 2 is a block diagram illustrating the configuration of a system for operating a gate of a vehicle according to an exemplary embodiment of the present invention.

FIG. 2 is a block diagram illustrating the configuration of a system for operating a gate of a vehicle according to an exemplary embodiment of the present invention.

First, referring to FIG. 1, a system 100 for operating a gate of a vehicle according to an exemplary embodiment of the present invention aims to allow a user to make a gate automatically operate even if the user cannot use his/her hands in order to remove the inconvenience in the related art.

For this purpose, the system 100 for operating a gate of a vehicle is mounted on an RV (Recreation vehicle) such as an MPV and an SUV and automatically open or close a gate by checking that a user steps on a laser point radiated onto the ground from the inside of the bumper.

Next, referring to FIG. 2, the system 100 for operating a gate of a vehicle according to an exemplary embodiment of the present invention includes a smart key recognizing unit 110, a first ultrasonic wave sensor unit 120, a laser diode unit 130, a second ultrasonic wave sensor unit 140, a gate driving unit 150, an emergency light 160, a speaker 170, and a control unit 180.

The smart key recognizing unit 110 is applied to a vehicle using a smart key. In addition, the smart key recognizing unit 110 recognizes that a user comes into a predetermined area from a vehicle by conducting local communication with a smart key that the user carries.

The first ultrasonic wave sensor unit 120 includes at least one ultrasonic wave sensor and is disposed at a side of a rear bumper of a vehicle, as illustrated in FIG. 1.

The first ultrasonic wave sensor unit 120 senses that the user approaches within a predetermined distance in a predetermined direction from the side.

When the user is positioned in the opening/closing range of a power gate that is operation, the user may be hit by the gate opening or closing, so that safety design is required.

Therefore, the first ultrasonic wave sensor unit 120 is disposed to face the side, not the right rear area of the vehicle in order to prevent the user from hitting against the gate, so that it guides the user to step aside from the opening/closing range in the right rear area.

Meanwhile, both the smart key recognizing unit 110 and the first ultrasonic wave sensor unit 120 are devices detecting that a user comes into a predetermined area from a vehicle. Therefore, if safety of the user can be ensured, the smart key recognizing unit 110 performs functions of the first ultrasonic wave sensor unit 120 instead of unit 120. That is, the unnecessary first ultrasonic wave sensor unit 120 is not provided in this case.

The laser diode unit 130 includes a plurality of laser diodes disposed in the rear bumper and radiates a plurality of laser points onto the ground to show the step positions (areas) that the user is supposed to step on in order to operate the gate.

For example, the laser diode unit 130 can show the step positions (areas) for the user by radiating circular laser points onto the ground under the right side of the rear bumper (behind the right rear wheel) of a vehicle, as illustrated in FIG. 1.

The shape of the laser points radiated on the ground is not limited to a circle and may be shown in various figures such as a foot shape, an arrow shape, or a polygonal shape to guide the user to safely steps on the points, when the gate is opened/closed.

The second ultrasonic wave sensor unit 140 includes at least one ultrasonic wave sensor, is disposed at the same position as that of the laser diode unit 130, and measures the distance from the ground where the laser points are radiated.

Further, the second ultrasonic sensor unit 140 senses that the distance from the ground has changed by the user's foot on a step position where a laser point is radiated.

Sensing a change in distance from the ground due to the user stepping on the step position is referred to as 'step input' and the status where the user keeps a fool on the step position is referred to as 'step-on status', in the following description.

That is, the second ultrasonic wave sensor unit 140 senses the step input that the user steps on the step position where a laser point is radiated, and then takes the foot back, for a short time, the step-on status that user keeps the foot on the step position, a status that the user keeps the step-on status for a predetermined time, and an un-step-on state that the user takes the foot back.

Further, the information of the status sensed in accordance with whether it is the step input or the step-on is used as an important input signal for operating the gate later.

Figure 3:
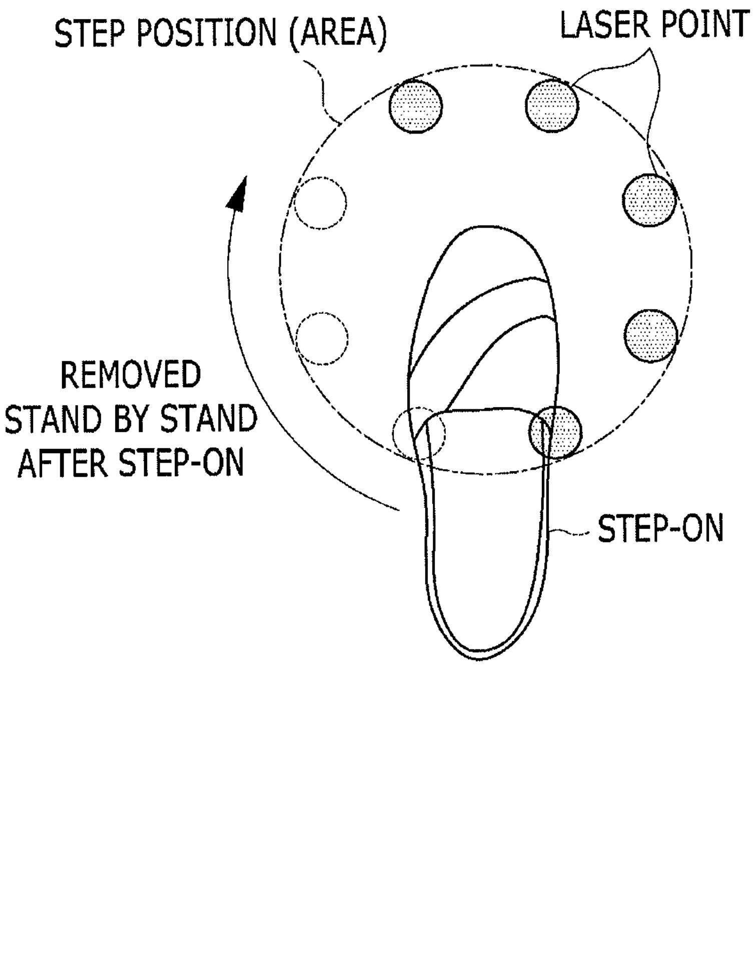
FIG. 3 is a diagram showing when a user steps on laser points according to an exemplary embodiment of the present invention.

FIG. 3 is a diagram showing when a user steps on laser points according to an exemplary embodiment of the present invention.

Referring to FIG. 3, the system 100 for operating a gate of a vehicle according to an exemplary embodiment of the present invention should keep the step-on status that the user keep a foot on a step position to prevent a malfunction of the gate due to a simply input way.

That is, an instruction of opening/closing the gate is normally inputted, only when the user keeps the step-on status for a predetermined time, and the instruction of opening/closing the gate is canceled, unless the step-on status is kept.

Assuming that the predetermined time is two seconds, the laser diode unit 130 can show a counting situation by removing the laser points radiated on the ground, within two seconds counted after the user steps on a laser point, step by step in a predetermined direction. That is, the laser diode unit 130 can improve visibility by showing the time that the user is supposed to keep the step-on status by removing the laser points step by step.

The gate driving unit 150, a device that automatically opens/closes the gate using a driving part such as a motor and an actuator in response to an applied control signal, has the same meaning as a power tail gate, a power gate, and a power trunk. The configuration of the gate driving unit 110 can be achieved by the technologies that have been known before this application, and is not described in detail.

The emergency light 160 visually showing the entire process of operating the gate which is performed by the user stepping on the step position, by flickering an emergency lamp.

The speaker 170 aurally outputs the entire process of operating the gate, similar to the emergency light 160.

The control unit 180 controls the operations of all the components in accordance with an algorithm that is programmed for the operation of the gate driving unit 150.

The control unit 180 can ascertain that an authenticated user is positioned close to the vehicle on the basis of recognition information from the smart key recognizing unit 110.

The control unit 180 can ascertain that the user is positioned within a predetermined distance in a predetermined direction in which the gate can be operated, on the basis of sensing information from the first ultrasonic sensor unit 120.

The control unit 180 controls the gate driving unit 150 for opening/closing on the basis of the position information of the user close to the vehicle and the step-on status information inputted from the second ultrasonic sensor unit 140.

Meanwhile, the smart key recognizing unit 110 is not provided in a vehicle not using the smart Key. Therefore, the first ultrasonic wave sensor unit 120 detects that a user comes into a predetermined area from a vehicle. Further, the first ultrasonic wave sensor unit 120 may be not provided, and the operation of the system for operating a gate 100 can be started from that the second ultrasonic wave sensor unit 140 senses the step-on status.

Figure 4:
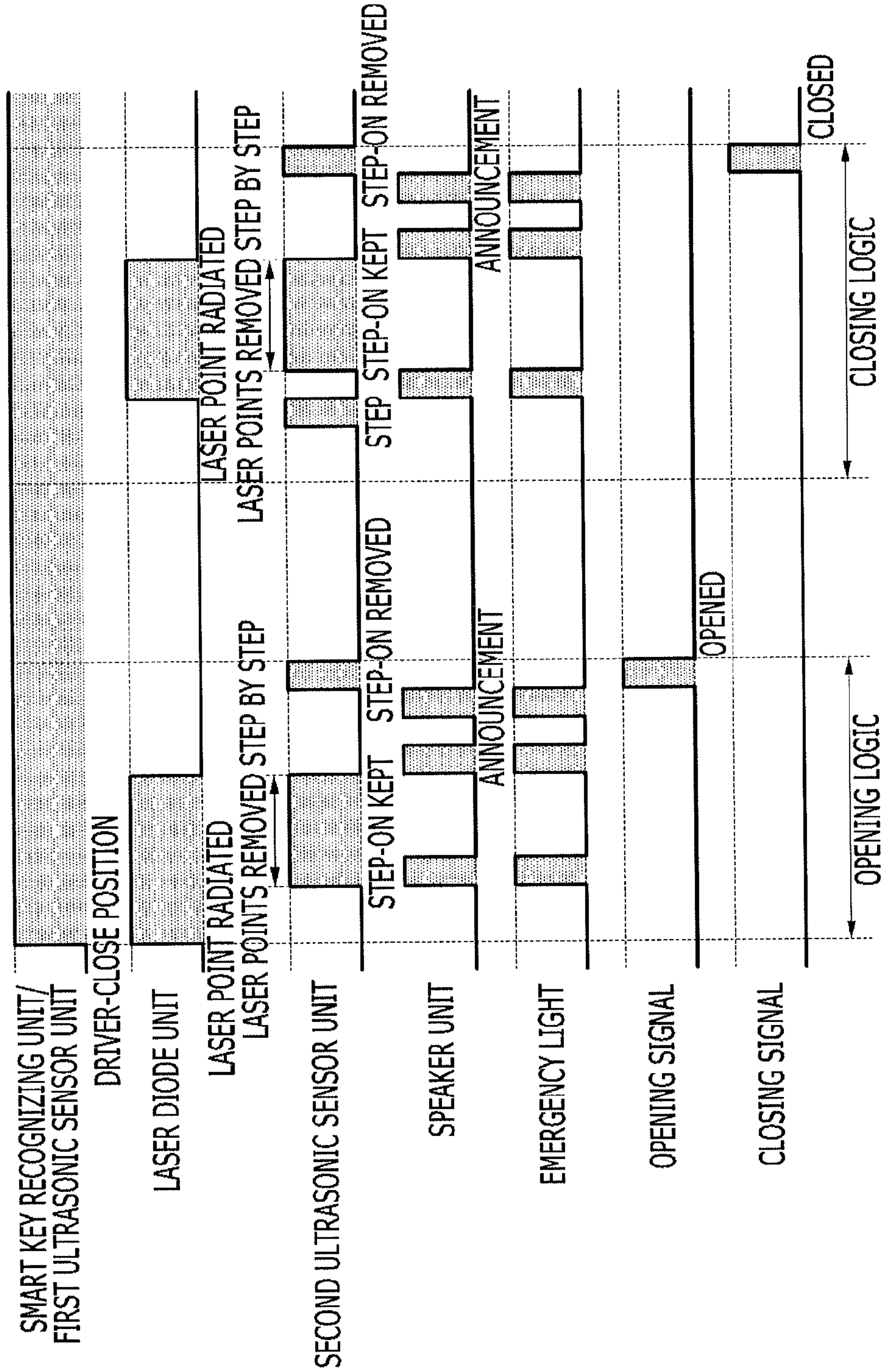
FIG. 4 is a diagram showing step input signals and gate opening/closing logics according to an exemplary embodiment of the present invention.

FIG. 4 is a diagram showing step input signals and gate opening/closing logics according to an exemplary embodiment of the present invention.

FIG. 4 shows a logic for the control unit 180 according to an exemplary embodiment of the present invention to control the gate driving unit 150 for opening/closing, on the basis of a gate operation algorithm and a sensing signal.

As for the logic for opening first, the control unit 180 controls the laser diode unit 130 to radiate laser points onto the ground, when it is found out that the user is positioned close to the vehicle with the gate closed.

Further, the control unit 180 checks whether the user keeps the step-on status for a predetermined time from when the user steps on a step position where a laser point is radiated until the laser points are all removed. Further, the control unit 180 operates the gate driving unit 150 for opening, when the user removing the step-on status by taking the foot back from the step position after keeping the step-on status for the predetermined time.

In contrast, as for the logic for closing, the control unit 180 controls the laser diode unit 130 to radiate laser points onto the ground, when at least one step of the user is recognized at a step position where a laser point is likely to be radiated with the gate open.

Further, the control unit 180 checks whether the user keeps the step-on position for a predetermined time until a plurality of laser points is all removed, from when the user steps on the step positions where the laser points are radiated. Thereafter, the control unit 180 operates the gate driving unit 150 for closing, when the step-on status by the user is removed.

Further, the control unit 180 outputs the situations of the processes of performing the logics for opening and closing the gate, through the speaker 170 and the emergency light 160. In particular, the control unit 180 can guide the user to step back behind the opening/closing range of the gate by outputting an announcement through the speaker 170, before the gate starts to open or close, when the user normally keeps the step-on status.

A method of operating a gate based on the configuration of the system 100 for operating a gate according to an exemplary embodiment of the present invention is described with reference to various exemplary embodiments hereafter.

First Exemplary Embodiment

A method of operating a gate according to the first exemplary embodiment of the present invention is described under the assumption that it includes the entire configuration of the system 100 for operating a gate.

Figure 5:
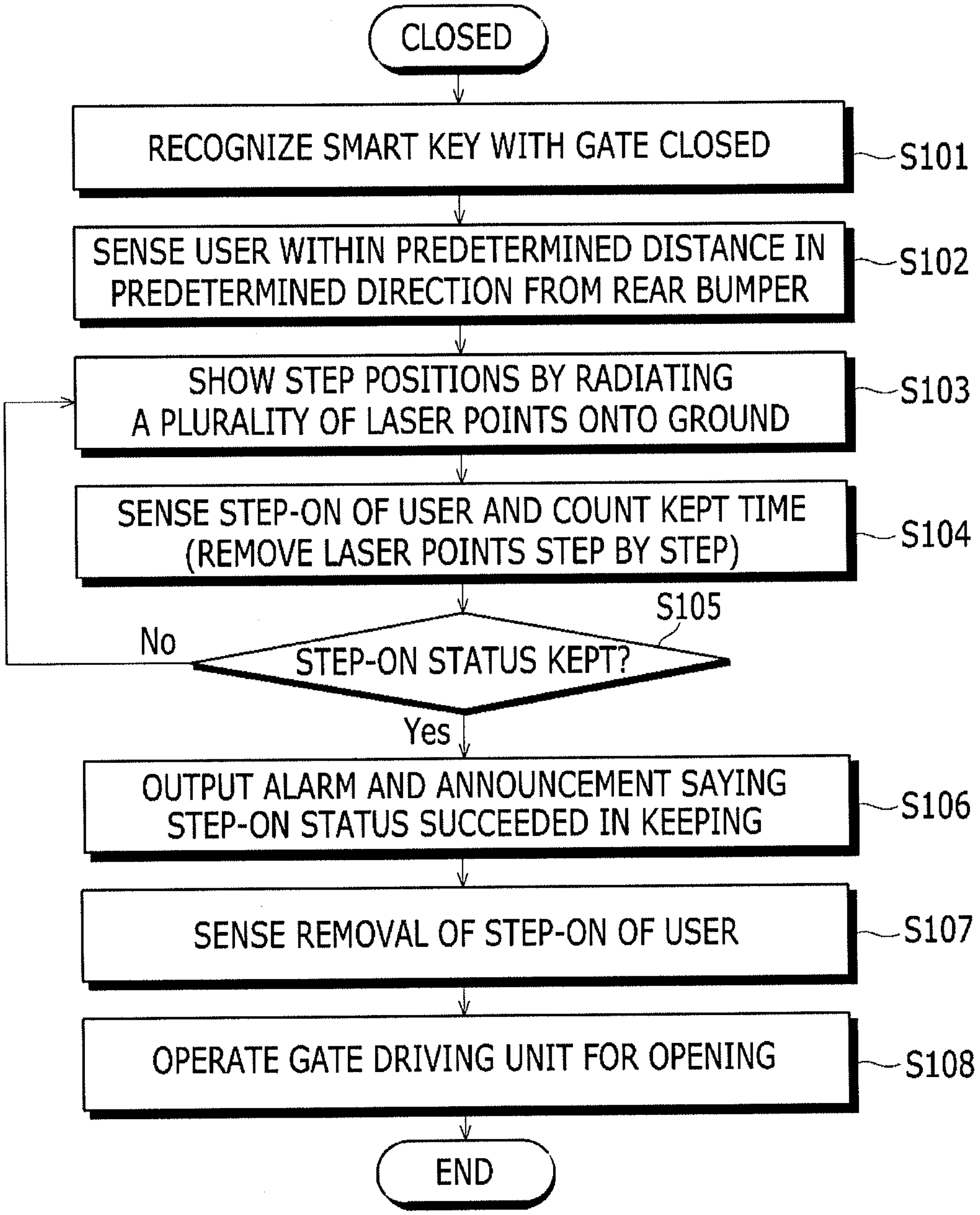
FIG. 5 is a flowchart illustrating a method of opening a gate according to various exemplary embodiments of the present invention.

FIG. 5 is a flowchart illustrating a method of opening a gate according to a first exemplary embodiment of the present invention.

It is assumed that a user with loads in both hands comes close to a vehicle to put the loads on the vehicle, in describing the method of opening a gate according to the first exemplary embodiment of the present invention.

The system 100 for operating a gate ascertains that a user comes close to a predetermined area from a vehicle by recognizing a smart key, with the gate closed (S101).

The system 100 for operating a gate senses that the user is within a predetermined distance in a predetermined direction from a side of a rear bumper, using the first ultrasonic sensor unit 120 (S102).

The system 100 for operating a gate shows step positions for operation the gate to the user by radiating a plurality of laser points onto the ground, using the laser diode unit 130, when the first ultrasonic sensor unit 120 senses the user (S103). The laser points may be shown in circles or polygons, or foot shapes or arrow shapes for guiding the step direction in consideration of safety of the user.

The system 100 for operating a gate checks whether the user keeps the step-on status by counting a predetermined time, when the second ultrasonic sensor unit 140 senses that the user has stepped on the step positions (S104).

The system 100 for operating a gate can output that the step of the user has been sensed, through an alarm from the speaker 170 and the emergency light 160, and can inform the user of the situation that the step-on state is kept by removing the laser points step by step for the predetermined time.

The system 100 for operating a gate outputs that a step-on input signal has been normally processed, through an alarm from the speaker 170 and the emergency light 160, when the user succeeds in keeping the step-on status for the predetermined time (YES in S105)(S106). The system 100 for operating a gate can guide the user to step back behind the opening/closing range of the gate by outputting an announcement through the speaker 170.

The system 100 for operating a gate opens the gate by transmitting a control signal to the gate driving unit 150 (S108), when the second ultrasonic sensor unit 140 senses that the step-on status is removed by the user taking the foot back from the step position (S107).

Though not shown in the drawings, the system 100 for operating a gate may operate the gate in safe, after making sure that the user has moved to a predetermined distance or more from a side of the rear bumper, using the first ultrasonic sensor unit 120.

Thereafter, the user closes the gate by pushing a close switch when finishing putting all the loads in a luggage room.

In contrast, when the user does not keep the step-on status for the predetermined time in S105 (NO in S105), the process may return to S103 to input a step-on signal again.

Figure 6:
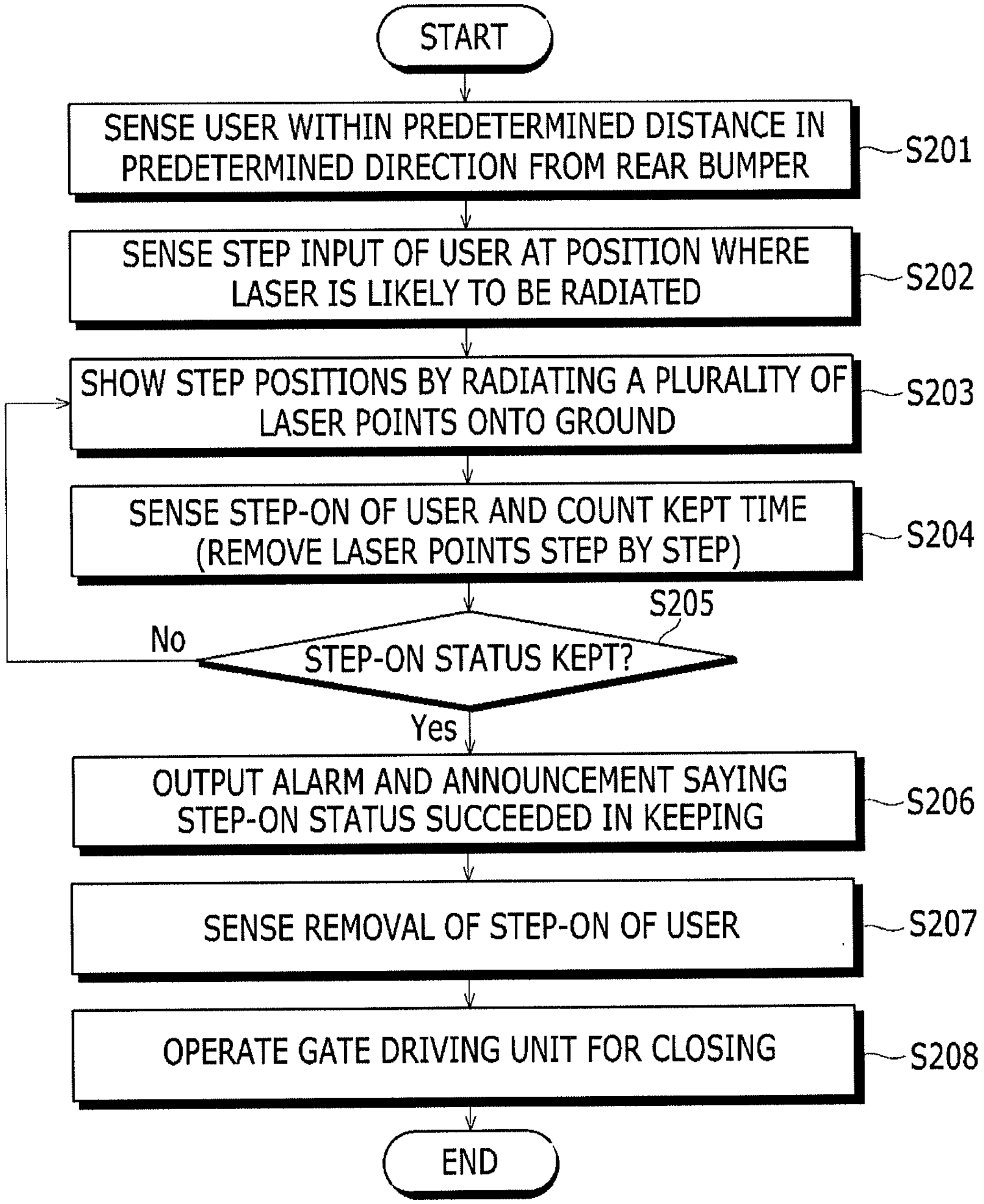
FIG. 6 is a flowchart illustrating a method of closing a gate according to the various exemplary embodiments of the present invention.

FIG. 6 is a flowchart illustrating a method of closing a gate according to the first exemplary embodiment of the present invention.

Referring to FIG. 6, a method of closing a gate according to the first exemplary embodiment of the present invention is described under the assumption that a user who reaches a destination pushes an open switch in the vehicle or on the smart key, goes to the open luggage room and takes out the loads, and then closes the gate.

The system 100 for operating a gate senses that the user is within a predetermined distance in a predetermined direction from a side of the rear bumper, with the gate open, using the first ultrasonic sensor unit 120 (S201).

Further, the system 100 for operating a gate senses step input of the user when the user steps on a step position where a laser point is likely to be radiated, using the second ultrasonic sensor unit 140 (S202). The second ultrasonic wave sensor unit 140 can sense the step input of the user according to a change in distance of the step position by keeping measuring the distance from the bottom of the rear bumper to the ground, even if a laser point is not radiated.

The system 100 for operating a gate shows step positions for operating the gate to the user by radiating a plurality of laser points onto the ground, using the laser diode unit 130, as the second ultrasonic sensor unit 140 senses the step input (S203).

The system 100 for operating a gate checks whether the user keeps the step-on status by counting a predetermined time, when the second ultrasonic sensor unit 140 senses that the user steps on the step positions (S204).

The system 100 for operating a gate can output that the step of the user has been sensed, through an alarm from the speaker 170 and the emergency light 160, and can inform the user of the situation that the step-on state is kept by removing the laser points step by step for the predetermined time.

The system 100 for operating a gate outputs that a step-on input signal has been normally processed, through an alarm from the speaker 170 and the emergency light 160, when the user succeeds in keeping the step-on status for the predetermined time (YES in S205)(S206). The system 100 for operating a gate can guide the user to step back behind the opening/closing range of the gate by outputting an announcement through the speaker 170.

The system 100 for operating a gate closes the gate by transmitting a control signal to the gate driving unit 150 (S208), when the second ultrasonic sensor unit 140 senses that the step-on status is removed by the user taking the foot back from the step position (S207).

In contrast, when the user does not keep the step-on status for the predetermined time in S105 (NO in S205), the process may return to S203 to input a step-on signal again.

Second Exemplary Embodiment

A method of operating a gate according to the second exemplary embodiment of the present invention is described under the assumption that it includes the entire configuration of the system 100 for operating a gate, except for the configuration of the first ultrasonic sensor unit 120.

Figure 7:
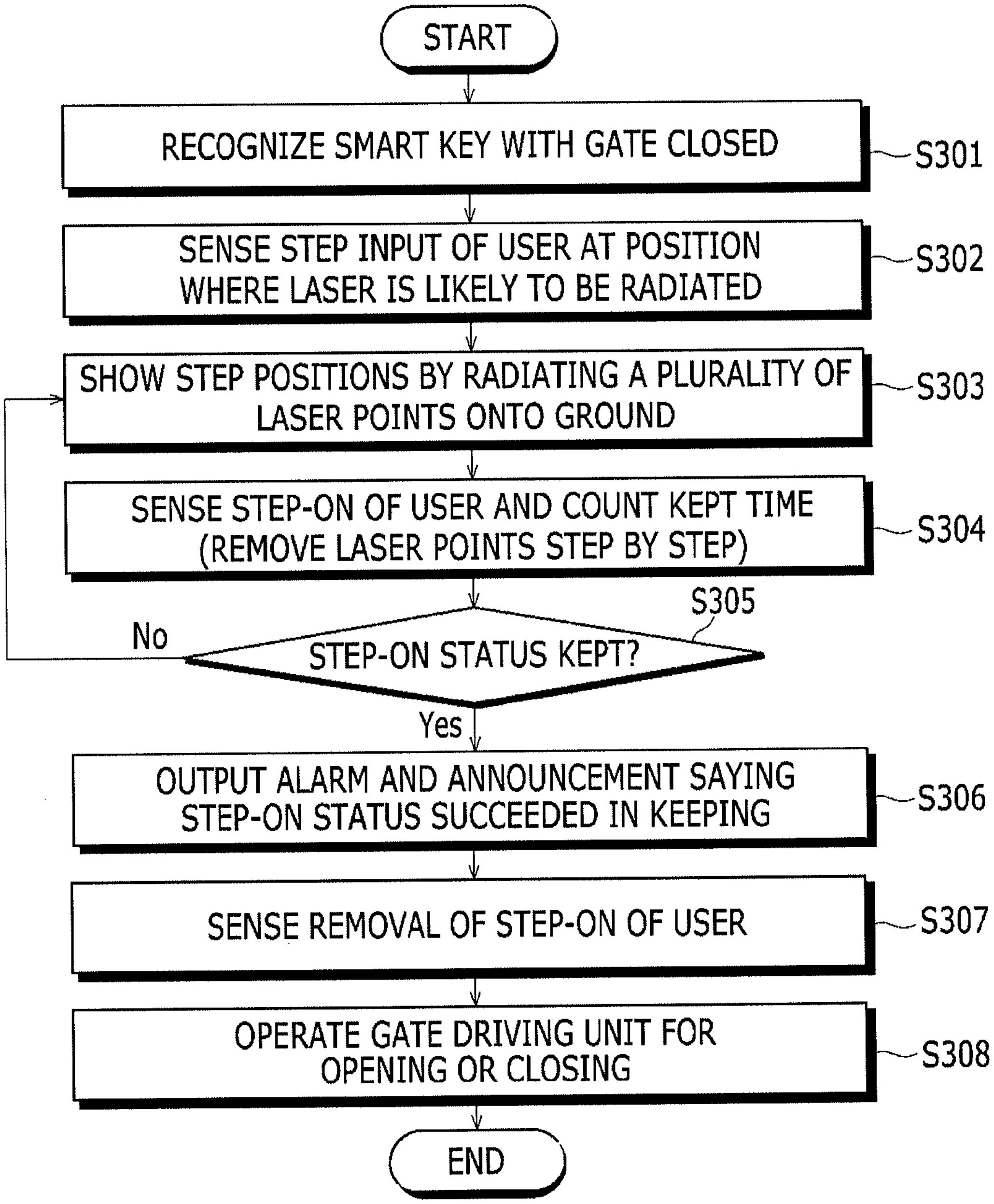
FIG. 7 is a flowchart illustrating a method of opening a gate according to various exemplary embodiments of the present invention.

FIG. 7 is a flowchart illustrating a method of opening a gate according to a second exemplary embodiment of the present invention.

Referring to FIG. 7, the system 100 for operating a gate according to the second exemplary embodiment of the present invention ascertains that a user is positioned around a vehicle by recognizing a smart key (S301).

The system 100 for operating a gate senses step input of the user when the user steps on a step position where a laser point is likely to be radiated, using the second ultrasonic sensor unit 140 (S302).

The system 100 for operating a gate shows step positions for operating the gate to the user by radiating a plurality of laser points onto the ground, using the laser diode unit 130, in accordance with a signal sensing the step input of the user (S303). The laser points may be shown in circles or polygons, or foot shapes or arrow shapes for guiding the step direction in consideration of safety of the user.

The system 100 for operating a gate checks whether the user keeps the step-on status by counting a predetermined time, when the second ultrasonic sensor unit 140 senses that the user has stepped on the step positions (S304).

The system 100 for operating a gate can output that the step of the user has been sensed, through an alarm from the speaker 170 and the emergency light 160, and can inform the user of the situation that the step-on state is kept by removing the laser points step by step for the predetermined time.

The system 100 for operating a gate outputs that a step-on input signal has been normally processed, through an alarm from the speaker 170 and the emergency light 160, when the user succeeds in keeping the step-on status for the predetermined time (YES in S305)(S306). The system 100 for operating a gate can guide the user to step back behind the opening/closing range of the gate by outputting an announcement through the speaker 170.

The system 100 for operating a gate opens or closes the gate by transmitting a control signal to the gate driving unit 150 (S308), when the second ultrasonic sensor unit 140 senses that the step-on status is removed by the user taking the foot back from the step position (S308).

That is, the system 100 for operating a gate can close the gate when the gate is open or opens the gate when the gate is closed, before S301.

In contrast, when the user does not keep the step-on status for the predetermined time in S305 (NO in S305), the process may return to S303 to input a step-on signal again.

Third Exemplary Embodiment

A method of operating a gate according to the second exemplary embodiment of the present invention is described under the assumption that it includes the entire configuration of the system 100 for operating a gate, except for the smart key recognizing unit 110.

Figure 8:
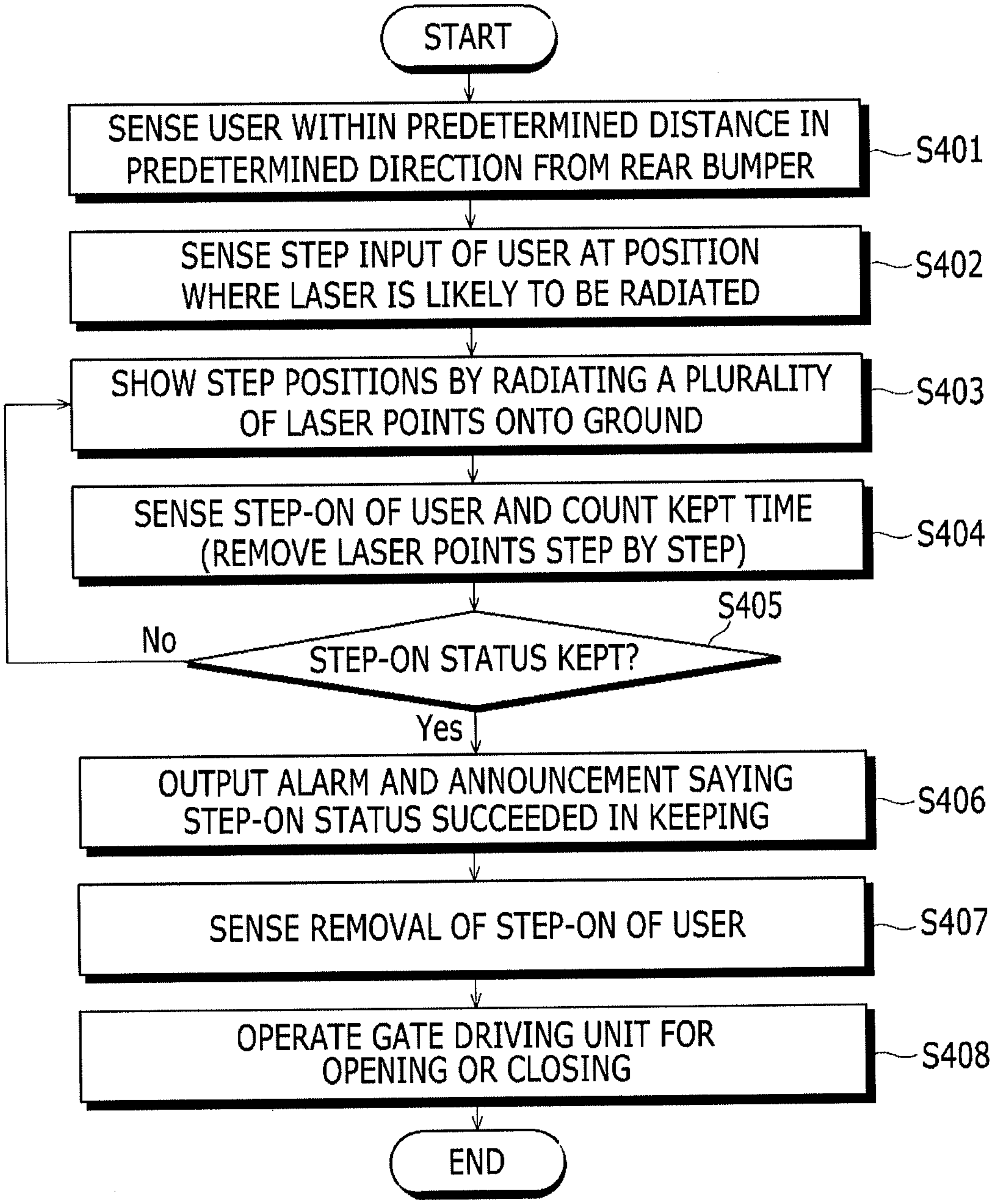
FIG. 8 is a flowchart illustrating a method of operating a gate according to various exemplary embodiments of the present invention.

FIG. 8 is a flowchart illustrating a method of operating a gate according to a third exemplary embodiment of the present invention.

Referring to FIG. 8, the system 100 for operating a gate according to the third exemplary embodiment of the present invention senses that the user is within a predetermined distance in a predetermined direction from a side of a rear bumper, using the first ultrasonic sensor unit 120 (S401).

Further, the system 100 for operating a gate senses step input of the user when the user steps on a step position where a laser point is likely to be radiated, using the second ultrasonic sensor unit 140 (S402).

The system 100 for operating a gate shows step positions for operating the gate to the user by radiating a plurality of laser points onto the ground, in response to a step input signal inputted with the position of the user sensed (S403). The laser points may be shown in circles or polygons, or foot shapes or arrow shapes for guiding the step direction in consideration of safety of the user.

The system 100 for operating a gate checks whether the user keeps the step-on status by counting a predetermined time, when the second ultrasonic sensor unit 140 senses that the user has stepped on the step positions (S404).

The system 100 for operating a gate can output that the step of the user has been sensed, through an alarm from the speaker 170 and the emergency light 160, and can inform the user of the situation that the step-on state is kept by removing the laser points step by step for the predetermined time.

The system 100 for operating a gate outputs that a step-on input signal has been normally processed, through an alarm from the speaker 170 and the emergency light 160, when the user succeeds in keeping the step-on status for the predetermined time (YES in S405)(S406). The system 100 for operating a gate can guide the user to step back behind the opening/closing range of the gate by outputting an announcement through the speaker 170.

The system 100 for operating a gate opens or closes the gate by transmitting a control signal to the gate driving unit 150 (S308), when the second ultrasonic sensor unit 140 senses that the step-on status is removed by the user taking the foot back from the step position (S408).

That is, the system 100 for operating a gate can close the gate when the gate is open or opens the gate when the gate is closed, before S401.

In contrast, when the user does not keep the step-on status for the predetermined time in S405 (NO in S405), the process may return to S403 to input a step-on signal again.

Meanwhile, in the first, second, and third exemplary embodiments of the present invention, the above mentioned steps can be performed from the steps (S103, S203, S303, S403) that the laser diode unit 130 shows step positions in a case that both the smart key recognizing unit 110 and the first ultrasonic wave sensor unit 120 are not provided. Herein, the case that both the smart key recognizing unit 110 and the first ultrasonic wave sensor unit 120 are not provided, may be a case that the system 100 is applied to the vehicle not using the smart key.

As described above, according to an exemplary embodiment of the present invention, a user can safety and accurately open a gate and put loads on a vehicle, only be stepping on laser points radiated on the ground, without putting the loads down on the ground, even if the user cannot freely uses both hands with the loads.

Further, since the user getting off the vehicle after finishing driving can make a gate automatically close by inputting a step-on signal, even if the user cannot use both hands because of loads taken out from the luggage room, it is possible to improve convenience of using the vehicle.

Further, it is possible to give a feature discriminated from other existing vehicles and improve productivity of the vehicle where the present invention is applied, by satisfying the desired of users who want to open/close a gate without pushing a button for operating the gate after putting loads down, even under various circumstances with both hands not free.

The exemplary embodiments of the present invention are implemented not only by the method and/or apparatus, but programs that achieve functions corresponding to the configuration of the exemplary embodiments of the present invention or recording mediums including the programs. Further, this can be easily implemented from the description of the exemplary embodiments by those skilled in the art.

For convenience in explanation and accurate definition in the appended claims, the terms “upper”, “lower”, “inner” and “outer” are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system configured to operate a gate of a vehicle, comprising:

a laser diode unit configured to show a plurality of step positions to operate the gate by radiating a plurality of laser points onto the ground beneath the vehicle;

an ultrasonic wave sensor unit configured to measure a distance between a bottom of a rear bumper and the ground where the plurality of the step positions are shown, and sense a user’s step based on a change in the distance due to the user stepping on the plurality of step positions;

a gate driving unit configured to open or close the gate using a driving part; and a control unit configured to control the gate driving unit and open or close the gate according to the user succeeding in maintaining a step-on status during a predetermined time as sensed by the ultrasonic wave sensor unit;

wherein the step-on status corresponds to the user stepping on the plurality of step positions in a predetermined order during the predetermined time, and wherein the laser diode unit removes each of the plurality of laser points on a step by step basis during the predetermined time in which the user is supposed to step on the plurality of step positions and maintain the step-on status.

2. The system of claim 1, further including a smart key recognizing unit that recognizes a smart key of the user who is in a predetermined area from the vehicle and detects a position of the user.

3. The system of claim 2, wherein the laser diode unit radiates the plurality of laser points onto the ground, when the smart key recognizing unit detects the position of the user with the smart key.

4. The system of claim 1, wherein the laser diode unit radiates the plurality of laser points onto the ground, when the ultrasonic wave sensor senses a step input of the user.

5. The system of claim 1, wherein the control unit controls the gate driving unit for opening, when the user removes the step-on status after maintaining the step-on status for the predetermined time, with the gate closed.

6. The system of claim 1, wherein the control unit controls the gate driving unit for closing, when the user removes the step-on status after maintaining the step-on status for the predetermined time, with the gate open.

7. The system of claim 1, wherein the plurality of laser points are radiated in any one shape of a circle, a polygon, and a foot shape and an arrow shape which guides a step from a predetermined direction of the rear bumper.

8. The system of claim 1, further including:

an emergency light that visually shows an entire process of operating the gate which is performed by the user stepping on the plurality of step positions by flickering an emergency lamp; and a speaker that aurally outputs the entire process of operating the gate, using an alarm.

9. The system of claim 8, wherein the control unit outputs an announcement for the user to safely step back behind an opening/closing range of the gate, through the speaker when the gate driving unit opens or closes the gate.

10. A method of operating a gate by using a system for operating the gate of a vehicle, comprising:

a) detecting a position of a user who is in a predetermined area from the vehicle;

b) showing a plurality of step positions by radiating a plurality of laser points onto the ground beneath the vehicle when the position of the user is detected;

c) measuring a distance between a bottom of a rear bumper and the ground where the plurality of step positions are shown, and sensing a user’s step based on a change in the distance due to the user stepping on the plurality of step positions; and d) controlling opening or closing operations of a gate driving unit, when the user succeeds in maintaining a step-on status for a predetermined time, wherein the step-on status corresponds to the user stepping on the plurality of step positions in a predetermined order during the predetermined time;

wherein the user is informed that the step-on status is maintained by removing each of the plurality of laser points on a step by step basis during the predetermined time, between the step c) and step d).

11. The method of claim 10, wherein the step d) outputs an announcement for the user to safely step behind an opening or closing range of the gate, through a speaker, when the user succeeds in maintaining the step-on status.

12. The method of claim 10, wherein the step d) transmits a control signal for controlling the opening or closing operations of the gate driving unit by sensing removal of the step-on status after maintaining the step-on status for the predetermined time.

13. The method of claim 10, wherein the step d) opens or closes the gate, after making sure that the user is spaced at a predetermined distance from the rear bumper.

14. A method of operating a gate by using a system for operating the gate of a vehicle, comprising:

a) sensing a user’s step when the user steps onto one of a plurality of step positions where one of a plurality of laser points are likely to be radiated onto the ground beneath the vehicle;

b) showing the plurality of step positions by radiating the plurality of laser points onto the ground beneath the vehicle, upon sensing the user’s step;

c) measuring a distance between a bottom of a rear bumper and the ground beneath the vehicle where the plurality of the step positions are shown, and sensing the user’s subsequent steps based on a change in the distance due to the user stepping on the plurality of step positions; and d) controlling opening or closing operations of a gate driving unit, when the user succeeds in maintaining a step-on status during a predetermined time, wherein the step-on status corresponds to the user stepping on the plurality of step positions in a predetermined order during the predetermined time;

wherein the user is informed that the step-on status is maintained by removing each of the plurality of laser points based on a step by step basis during the predetermined time, between the step c) and step d).

15. The method of claim 14, wherein the step d) outputs an announcement for the user to step back behind an opening or closing range of the gate, through a speaker, when the user succeeds in maintaining the step-on status.

16. The method of claim 14, wherein the step d) transmits a control signal for controlling the opening or closing operations of the gate driving unit by sensing removal of the step-on status after maintaining the step-on status for the predetermined time.

17. The method of claim 14, wherein the step d) opens or closes the gate, after making sure that the user is spaced at a predetermined distance from the rear bumper.

* * * * *